Figure 1:
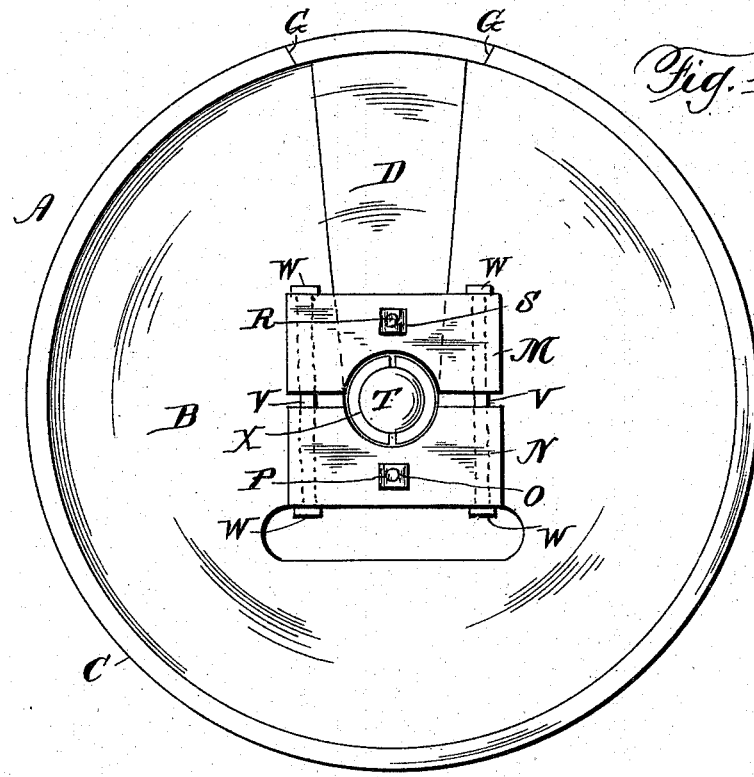

(No Model.)  3 Sheets—Sheet 1.

M. B. LORAH.
PULLEY.

No. 530,282.  Patented Dec. 4, 1894.

Witnesses:
Wm E. Poulter.
Howard P. Ash.

Inventor:
Mahlon B. Lorah,
by H. A. Willson.
attorney.

(No Model.) 3 Sheets—Sheet 2.

M. B. LORAH.
PULLEY.

No. 530,282. Patented Dec. 4, 1894.

Witnesses:
Howard P. Ash.
Annie A. Lansdale.

Inventor:
Mahlon B. Lorah
by N. P. Willson.
attorney.

(No Model.) 3 Sheets—Sheet 3.

M. B. LORAH.
PULLEY.

No. 530,282. Patented Dec. 4, 1894.

Witnesses:
Wm E Poulter
Howard P Ash

Inventor:
Mahlon B. Lorah
by H. P. Willson
attorney

UNITED STATES PATENT OFFICE.

MAHLON B. LORAH, OF READING, PENNSYLVANIA.

PULLEY.

SPECIFICATION forming part of Letters Patent No. 530,282, dated December 4, 1894.

Application filed January 22, 1894. Serial No. 497,635. (No model.)

*To all whom it may concern:*

Be it known that I, MAHLON B. LORAH, a citizen of the United States, residing at Reading, in the county of Berks and State of Pennsylvania, have invented certain new and useful Improvements in Pulleys; and I do hereby declare the following to be a full, clear, and exact description of the invention, such as will enable others skilled in the art to which it appertains to make and use the same.

My invention has relation to pulleys for use in various classes of machinery, and it has relation more particularly to that class of wood pulleys known as sectional pulleys, and among the objects in view is to provide a pulley of the class referred to which may be quickly and conveniently mounted upon shafting of various sizes and when so mounted will be firmly secured and prevented from slipping; and another object of my invention is to provide a sectional pulley which will be extremely strong and durable, inexpensive and simple in its construction, perfectly balanced at all times and readily cleaned; and with the above and other objects in view all of which will appear when the nature of the invention is better understood, the invention consists in the novel construction, arrangement and combination of parts, as hereinafter fully described, illustrated in the drawings, and pointed out in the appended claim.

Figure 2:
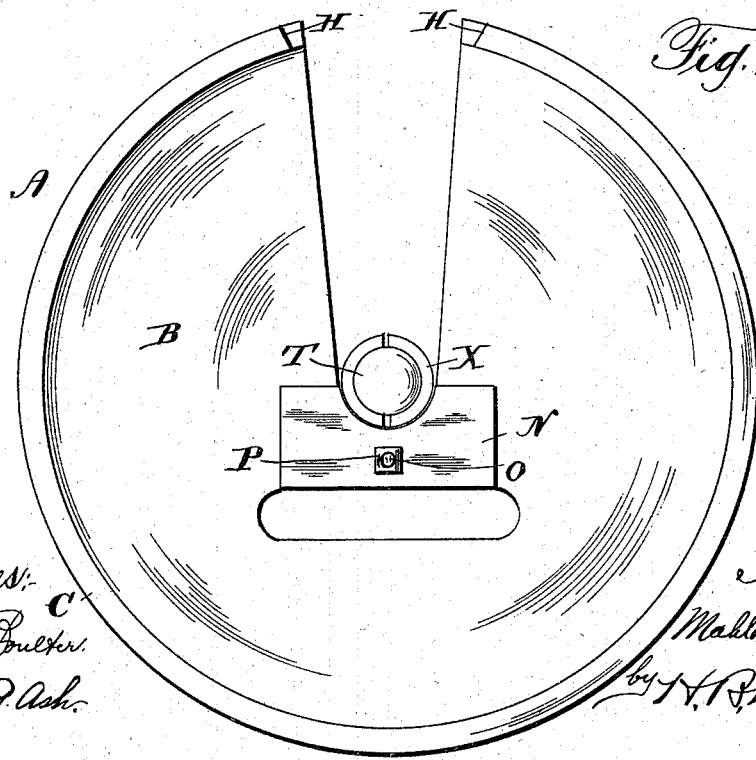
Figure 7:
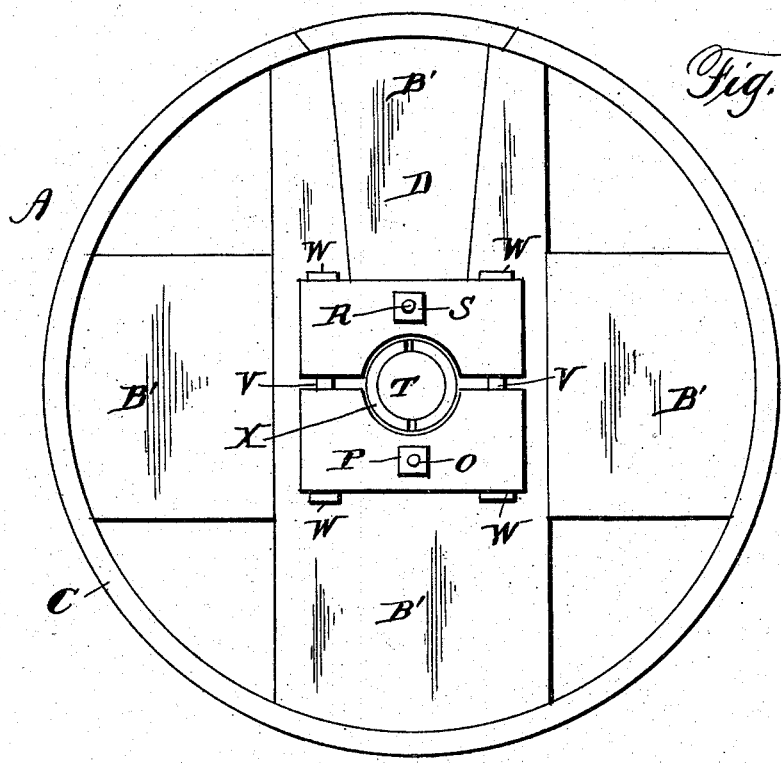
Figure 3:
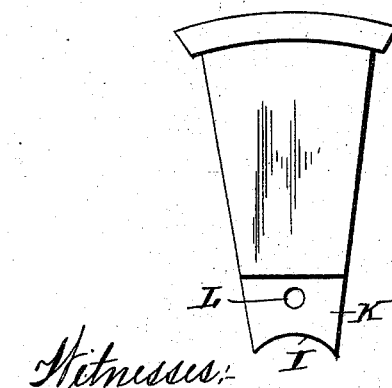
Figures 4, 5:
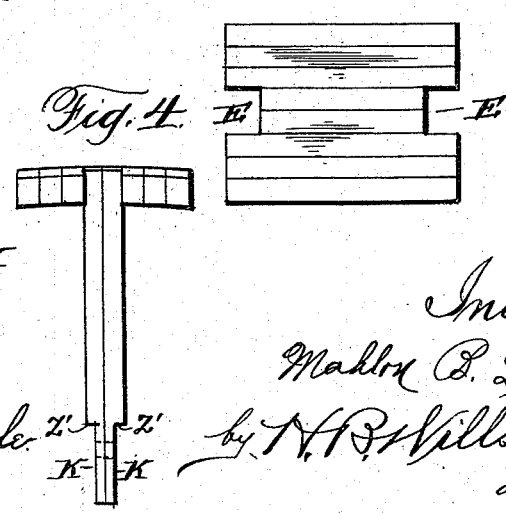
Figure 6:
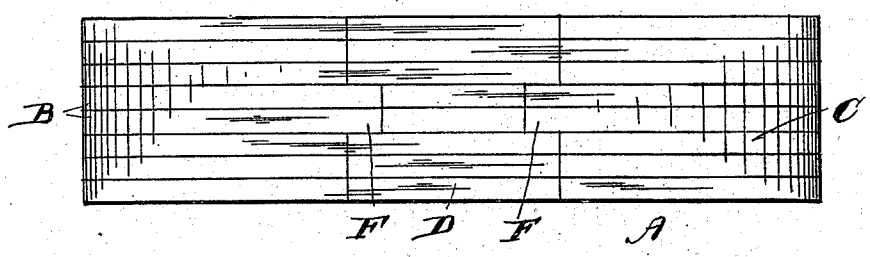
Figure 8:
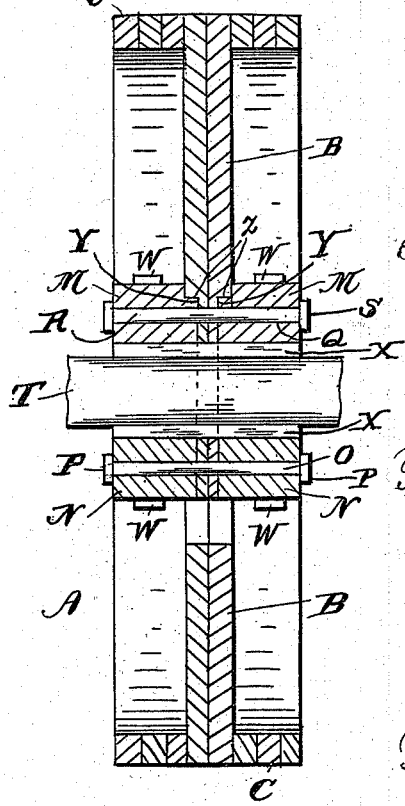
Figure 9:
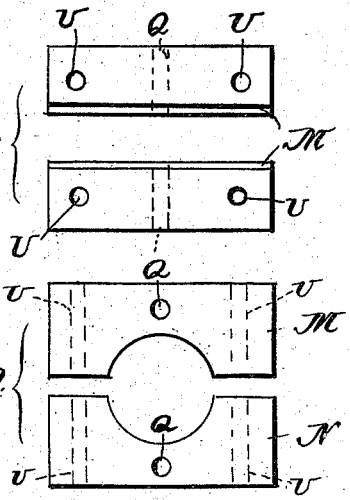
Figure 10:
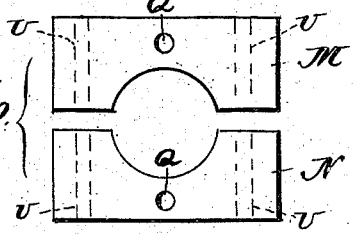
Figure 11:
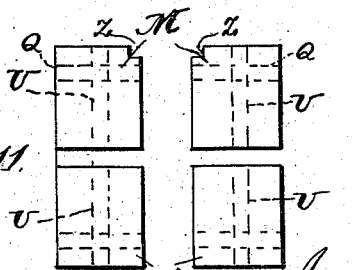

In the drawings:—Figure 1 is a face view of a pulley constructed in accordance with my invention. Fig. 2 is a similar view with its removable section and upper shaft bearing removed. Fig. 3 is a face view of the removable section; Fig. 4, an edge view thereof; Fig. 5, a plan view of said section. Fig. 6 is a plan view of the complete pulley. Fig. 7 is a view similar to Fig. 1 showing a slight modification in the construction of the pulley. Fig. 8 is a vertical central transverse section of the pulley shown in Fig. 1. Fig. 9 is a plan view of the shaft bearings. Fig. 10 is a face view thereof, and Fig. 11 is an end view of said bearings.

Referring to the above-described drawings, A indicates my improved sectional pulley, preferably constructed of layers of wood, and comprising the web B, and rim C.

I preferably make the web B solid or substantially so, so that there will be substantially no resistance offered to its rotation by the surrounding air which however would be the case were arms used instead of the solid web. Moreover a solid web prevents the accumulation of dirt.

I preferably construct the web B of two layers of wood the grains of which cross each other, the diameter of the web being sufficiently great to allow said web to extend between the sections of the rim C, which sections are secured in any desired manner upon each side of and to the said web. By this construction I obtain great strength and durability.

D indicates the removable section of the pulley said section consisting of a portion of the web B and portions of the rim C.

The shape of the section D is that shown in Figs. 3, 5, and 6, the web of the section being slightly tapering, while the rim portions thereof are so shaped as to represent somewhat the shape of the letter H, that is to say the rim portions of the section D are of slightly greater length circumferentially than the intermediate web portion thus forming the grooves E, E, into which snugly fit the tenons F, F, when the section D is in its proper position, to thus securely hold said section in place.

The lateral edges of the rim portions of the section D are inclined or beveled as at G, G, while the adjacent edges of the rim of the pulley are correspondingly inclined or beveled as at H, H, so that a true and snug fitting of the section D in place may be secured.

The lower edge of the section D is curved as at I, to correspond to the curvature of the shafting upon which the pulley is to be mounted, and said section is also cut away at each side as at K, K, and provided with a perforation L for purposes presently apparent.

M, N, represent respectively the upper and lower bearings or boxes for the shafting, each of which bearings consists of two portions or sections arranged upon opposite sides of the web. The portions of the lower bearing may be secured to the web in any suitable manner as for instance by means of a screw-rod or bolt O passing through said portions and the web and secured by nuts P. The upper bearing is preferably adapted to be readily detached for the purpose of permitting the insertion of the shafting. The portions of said upper bearing are therefore provided with the horizontal perforations Q which are adapted to align with each other and with the perforation L in the section D when the latter is in place and through the several aligned perforations is passed a screw-rod or bolt R upon the ends of which are screwed nuts S, whereby the said portions of the upper bearing and the section D are firmly yet detachably fitted in position. The lower faces of the portions of the upper bearing and the upper faces of the portions of the lower bearing are provided with curved seats for the shafting T, and for clamping the pulley to said shafting each of the bearings is provided with aligned perforations U extending vertically therethrough through which are passed screw-rods or bolts V upon the ends of which are screwed nuts W for thus drawing the sections of the bearings together and causing them to tightly clamp the shafting.

For adapting the pulley to be used with various sizes of shafting, I so construct the seats of the bearings that the annular opening formed when said bearings are in position will be somewhat large in size, so that by employing bushings X inserted within the shaft opening, which bushings are made in sections, the size of the opening may be reduced to correspond to the diameter of the shafting, and which sections of the bushing will be caused to tightly clamp the shafting when the tightening nuts W are turned tightly into place.

The web of the pulley may be cut away at each side as at Y to form shoulders against which snugly fit the shoulders Z formed by cutting away the adjacent faces of the sections of the bearings M, N, and against the said shoulders Z fit the shoulders Z' formed by the cut away portions K, of the section D. Thus the section D and the portions of the shaft bearings are tightly and snugly fitted in position.

If desired I may employ arms B' for my pulley instead of the solid web described, as seen in Fig. 7, though I prefer to employ said web for reasons before stated.

What I claim, and desire to secure by Letters Patent, is—

In a pulley, the combination with the web and the rim secured thereto, said web having a shaft opening and being cut away at opposite sides as at Y Y to form shoulders, of a removable section D having a perforation L and having its lower end curved and provided at opposite sides with shoulders Z' Z', shaft bearings consisting of sections arranged on opposite sides of the web, the lower faces of the portions of the upper bearing and the upper faces of the portions of the lower bearing being provided with curved seats for the shafting, the sections of the lower bearing being provided with aligned openings and a screw rod passing through said openings to secure the bearing to the web and the upper bearing sections being provided with shoulders Z fitting against the shoulders Y Y and against which shoulders Z fit the shoulders Z' on section D, and said sections of the upper bearing being provided with horizontal perforations Q aligning with each other and with the perforation L in section D, a screw-rod R passing through said perforations Q and L and provided with a securing nut, and the sections of the lower and upper bearings being provided with vertical aligned perforations U, and screw-rods passing through said aligned perforations U and provided with securing nuts, all as and for the purpose specified.

In testimony whereof I affix my signature in presence of two witnesses.

MAHLON B. LORAH.

Witnesses:
JOHN B. MYERS,
IRVIN D. E. SWARTZ.